United States Patent
Johnson et al.

(10) Patent No.: US 6,636,337 B2
(45) Date of Patent: Oct. 21, 2003

(54) OPTICAL SWITCHING DEVICE BASED ON STABLE, NON-ABSORBING OPTICAL HARD LIMITERS

(75) Inventors: Erik V. Johnson, Toronto (CA); Edward H. Sargent, Toronto (CA)

(73) Assignee: Nortel Networks Limited (CA)

(*) Notice: Subject to any disclaimer, the term of this patent is extended or adjusted under 35 U.S.C. 154(b) by 40 days.

(21) Appl. No.: 09/933,146

(22) Filed: Aug. 20, 2001

(65) Prior Publication Data

US 2002/0109873 A1 Aug. 15, 2002

Related U.S. Application Data

(60) Provisional application No. 60/267,879, filed on Feb. 9, 2001.

(51) Int. Cl.[7] .............................. G06E 1/02; H04J 14/00

(52) U.S. Cl. ...................... 359/108; 359/107; 398/43; 398/45; 398/78

(58) Field of Search .................................. 359/107, 108; 398/43, 45, 52, 53, 54, 77, 78, 98, 99

(56) References Cited

U.S. PATENT DOCUMENTS

| | | |
|---|---|---|
| 4,128,300 A | 12/1978 | Stotts et al. |
| 4,262,992 A | 4/1981 | Berthold, III |
| 4,573,767 A | 3/1986 | Jewell |
| 4,764,889 A | 8/1988 | Hinton et al. |
| 4,864,536 A | 9/1989 | Lindmayer ................ 365/119 |
| 4,894,818 A | 1/1990 | Fujioka et al. ............... 370/3 |
| 4,930,873 A | 6/1990 | Hunter |

(List continued on next page.)

FOREIGN PATENT DOCUMENTS

| | | | |
|---|---|---|---|
| JP | 06-095181 A | * | 4/1994 |

OTHER PUBLICATIONS

B.Y. Yu, et al., "Network demonstration of 100 Gbit/s optical packet switching with self–routing", Electronics Letters, vol. 33, No. 16, pp. 1401–1403, Jul. 31, 1997.*

P. Toliver, et al., "Routing of 100 Gb/s Words in a Packet–Switched Optical Networking Demonstration (POND) Node", Journal of Lightwave Technology, vol. 16, No. 12, pp. 2169–2180, Dec. 1998.*

K.–L. Deng, et al., "Demonstration of a highly scalable 100–Gbps OTDM computer interconnection with rapid inter–channel switching capability", Opt. Fiber Comm. Conf., & Int'l Conf. on Integr. Optics and Opt. Fiber Comm., OFC/IOOC '99, Tech'l Dig. vol. 3.*

"Wave proagation in nonlinear photonic band–gap materials" Li, et al., Physical Review B: Condensed Matter vol. 53, No. 23, 15577–15585 (Jun. 15, 1996).

"The Interaction of Electromagnetic Radiation with Magnetic Media" http://www.qub.ac.uk/mp/con/magnetics_group/magnetoptics.html. Apr. 2001.

"Three–Dimensional Arrays in Polymer Nanocomposites" Kumacheva, et al., Advanced Material, 1999, 11, No. 3.

"Intergrable, Low–Cost, All–Optical WDM Signal Processing: Narrowband Hard Limiters and Analog–to–Digital Converters" Sargent, et al., Jan. 2000.

(List continued on next page.)

Primary Examiner—John Juba
(74) Attorney, Agent, or Firm—Steubing McGuinness & Manaras LLP

(57) ABSTRACT

An optical switching device based on stable, non-absorbing optical hard limiters optically switches optical information from an input to a number of outputs based upon address information contained in the optical information. The optical switching device optically detects the location of the address bits in the optical information, optically samples the address bits, optically decodes the sampled address bits, optically activates an output based upon the decoded address bits, and optically outputs the optical information over the activated output.

4 Claims, 12 Drawing Sheets

U.S. PATENT DOCUMENTS

| | | | |
|---|---|---|---|
| 4,932,739 A | 6/1990 | Islam | |
| 4,962,987 A | 10/1990 | Doran | |
| 4,992,654 A | 2/1991 | Crossland et al. | 250/213 |
| 5,078,464 A | 1/1992 | Islam | 385/122 |
| 5,144,375 A | 9/1992 | Gabriel et al. | 356/345 |
| 5,315,422 A | 5/1994 | Utaka et al. | 359/107 |
| 5,325,222 A * | 6/1994 | Jacob et al. | 398/75 |
| 5,349,593 A | 9/1994 | Lomashevitch et al. | 372/50 |
| 5,461,507 A | 10/1995 | Westland et al. | 359/289 |
| 5,479,384 A | 12/1995 | Toth et al. | 364/14 |
| 5,488,501 A | 1/1996 | Barnsley | 359/137 |
| 5,537,243 A | 7/1996 | Fatehi et al. | 359/541 |
| 5,548,531 A * | 8/1996 | Shabeer | 359/127 |
| 5,617,232 A | 4/1997 | Takemori | 359/108 |
| 5,619,360 A * | 4/1997 | Marshall et al. | 359/140 |
| 5,623,366 A | 4/1997 | Hait | 359/577 |
| 5,655,039 A | 8/1997 | Evans | 385/27 |
| 5,739,933 A | 4/1998 | Dembeck et al. | 359/117 |
| 5,831,731 A | 11/1998 | Hall et al. | 356/345 |
| 5,900,956 A * | 5/1999 | Cotter | 359/139 |
| 5,912,753 A * | 6/1999 | Cotter et al. | 359/137 |
| 5,999,283 A | 12/1999 | Roberts et al. | 359/108 |
| 5,999,284 A | 12/1999 | Roberts | 359/108 |
| 6,005,791 A | 12/1999 | Gudesen et al. | 365/114 |
| 6,041,126 A | 3/2000 | Terai et al. | 381/71.6 |
| 6,044,341 A | 3/2000 | Takahashi | 704/226 |
| 6,545,786 B1 * | 4/2003 | Park et al. | 359/108 |
| 6,559,989 B1 * | 5/2003 | Kim et al. | 359/108 |

OTHER PUBLICATIONS

"Nonlinear Distributed Feedback Structures for Optical Sensor Protection" Brzozowski, et al., Apr. 2000.

"Optical Signal Processing Using Nonlinear Distributed Feedback Structures" Brzozowski, et al., IEEE Journal of Quantum Electronics, vol. 36, No. 5, May 2000.

"All–Optical Analog–to–Digital Converter for Photonic Networks Using Multilevel Signaling" Brzozowski, et al., Jun. 2000.

"Photonic Crystals for Intergrated Optical Computing" Brzozowski, et al., Jun. 2000.

"Nonlinear distributed–feedback structures as passive optical limiters" Brzozowski, et al., J. Opt. Soc. Am B, vol. 17, No. 8, Aug. 2000.

"Stability of Periodic Nonlinear Optical Structures for Limiting and Logic", Brzozowski, et al., Sep. 2000.

"Transmission Regimes of Periodic Nonlinear Optical Structures" Pelinovsky, Dmitry, Rapid Communications, Physical Review E, vol. 62, No. 4, Oct. 2000.

"Nonlinear Disordered Media for Broad–Band Optical Limiting" Brzozowski, et al., IEEE Journal of Quantum Electronics, vol. 36, No. 11, Nov. 2000.

"Realization of All–Optical Ultrafast Logic Gates Using Triple Core Asymmetric Nonlinear Directional Coupler", Natasa Trivunac–Vukovic, Journal of Optical Communications, 2001.

"All–Optical Analog–to–Digital Converters, Hardlimiters, and Logic Gates", Brzozowski, et al., Journal of Lightwave Technology, vol. 19, No. 1, Jan. 2001.

"Stable All–Optical Limiting in Nonlinear Periodic Structures", Pelinovsky, et al., Feb. 8, 2001.

"All–Optical Signal Processing and Packet Forwarding Using Nonmonotonic Intensity Transfer Characteristics", Johnson, E.V., A thesis submitted in conformity with the requirements for the degree of Master of Applied Science Graduate Department of electrical and Computer Engineering University of Toronto, 2001.

* cited by examiner

| data bits | | | | | | | address bits | | | | | flag |
|---|---|---|---|---|---|---|---|---|---|---|---|---|
| D | D | D | D | D | D | D | N | N-1 | • • • | 2 | 1 | F |

FIG. 1    <u>100</u>

OPTICAL SWITCHING DEVICE BASED ON STABLE, NON-ABSORBING OPTICAL HARD LIMITERS

PRIORITY

The present application claims priority from U.S. Provisional Patent Application No. 60/267,879, which was filed on Feb. 9, 2001, and is hereby incorporated herein by reference in its entirety.

CROSS-REFERENCE TO RELATED APPLICATION(S)

The present application may be related to the following commonly owned U.S. patent applications, which are hereby incorporated herein by reference in their entireties:

U.S. patent application Ser. No. 09/846,886 entitled OPTICAL LIMITER BASED ON NONLINEAR REFRACTION, filed on May 1, 2001 in the names of Edward H. Sargent and Lukasz Brzozowski;

U.S. patent application Ser. No. 09/933,315 entitled OPTICAL LOGIC DEVICES BASED ON STABLE, NON-ABSORBING OPTICAL HARD LIMITERS, filed on even date herewith in the names of Erik V. Johnson and Edward H. Sargent; and U.S. patent application Ser. No. 09/933,330 entitled OPTICAL SAMPLER BASED ON STABLE, NON-ABSORBING OPTICAL HARD LIMITERS, filed on even date herewith in the names of Erik V. Johnson and Edward H. Sargent.

FIELD OF THE INVENTION

The present invention relates generally to optical information processing, and more particularly to an optical switching device based upon stable, non-absorbing optical hard limiters.

BACKGROUND OF THE INVENTION

In today's information age, optical communication technologies are being used more and more frequently for transmitting information at very high speeds. Traditionally, information processing equipment (such as switches, routers, and computers) process information electronically. Therefore, optical communications are often converted into electronic form for processing by the information processing equipment. This electronic processing is slow relative to the speed of the optical communications themselves, and thus often becomes a "bottleneck" of optical communication and processing systems.

Optical information processing systems process information optically without the need to convert the information to an electronic form for processing electronically. One challenge in an optical information processing is the switching of optical information from an input to one of a number of outputs. Traditionally, optical information switching would be accomplished by converting the optical information into an electrical form, switching the information using traditional electronic means (e.g., routing based upon an address), and converting the switched information back into an optical form for further processing by the optical information processing system. This technique for switching optical information is limited by the speed of the electronics and becomes unsatisfactory as optical communication speeds increase.

Packet switching using all-optical logic has been explored using in band addressing systems (U.S. Pat. No. 5,739,933) and out-of-band addressing systems (U.S. Pat. No. 5,488,501, U.S. Pat. No. 4,894,818).

SUMMARY OF THE INVENTION

In accordance with one aspect of the invention, an optical switching device based on stable, non-absorbing optical hard limiters optically switches optical information from an input to a number of outputs based upon address information contained in the optical information. The optical switching device optically detects the location of the address bits in the optical information, optically samples the address bits, optically decodes the sampled address bits, optically activates an output based upon the decoded address bits, and optically outputs the optical information over the activated output.

In one exemplary embodiment of the invention, the optical information is split into successive copies with approximately one bit time delay between successive copies. Each of a number of successive copies is fed into an optical sampler, and the optical samplers are clocked at an appropriate time to sample a different address bit.

In another exemplary embodiment of the invention, the optical information is sampled using an optical shift register.

BRIEF DESCRIPTION OF THE DRAWINGS

In the accompanying drawings:

FIG. 1 is a block diagram showing the format of an exemplary packet in accordance with an embodiment of the present invention;

DETAILED DESCRIPTION OF A PREFERRED EMBODIMENT

Figure 2:
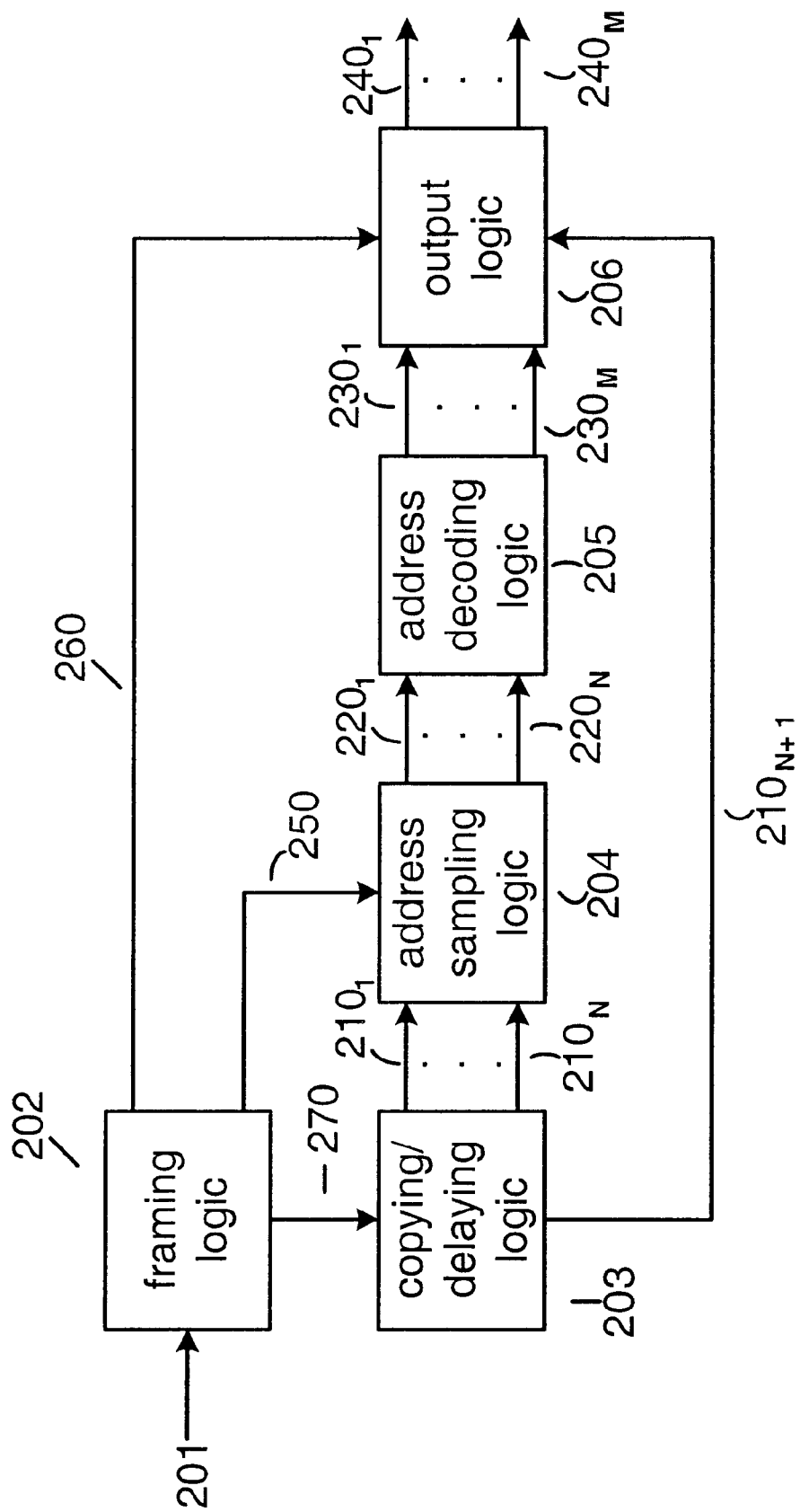
FIG. 2 is a schematic block diagram showing the relevant logic blocks of an optical switching device in accordance with an embodiment of the present invention.

In an embodiment of the present invention, an optical switching device switches optical information in the optical state. The optical switching device is based on stable, non-absorbing optical hard limiters. An exemplary stable, non-absorbing optical hard limiter is described in the related application entitled OPTICAL LIMITER BASED ON NONLINEAR REFRACTION incorporated by reference above. Various optical logic devices based on stable, non-absorbing optical hard limiters that may be used as components of the optical switching device are described in the related application entitled OPTICAL LOGIC DEVICES BASED ON STABLE, NON-ABSORBING OPTICAL HARD LIMITERS incorporated by reference above. An optical sampling/storage device based on stable, non-absorbing optical hard limiters that may be used as a component of the optical switching device is described in the related application entitled OPTICAL SAMPLER BASED ON STABLE, NON-ABSORBING OPTICAL HARD LIMITERS incorporated by reference above.

The optical switching device typically switches optical information from an input to one of a number of outputs based upon N address bits in the optical information. In order to switch a packet from an input to one of $M=2^N$ outputs, the optical switching device samples the N address bits using optical samplers, for example, as described in the related application entitled OPTICAL SAMPLER BASED ON STABLE, NON-ABSORBING OPTICAL HARD LIMITERS incorporated by reference above. The N sampled address bits are fed into an optical N-to-M address decoder, which activates one of the M optical outputs based upon the N optical inputs. Sufficient delay is introduced so that the packet can be output over the activated optical output.

In a typical embodiment of the present invention, the optical information is logically divided into individual messages, which, for convenience, are referred to hereinafter as packets. Each packet typically includes a starting flag, which marks the beginning of the packet, followed by N address bits and a number of data bits. The N address bits can be used to address up to M outputs.

FIG. 1 shows the format of an exemplary packet 100. The packet 100 includes starting flag 110, address bits 120, and data bits 130. For convenience, the address bits 120 are referred to hereinafter individually as address bits $120_1$–$120_N$.

In an embodiment of the present invention, the optical switching device switches a packet from an input to one of M outputs by removing the starting flag from the packet and making N+1 successive copies of the resulting packet with approximately one bit time delay between successive copies. Thus, for example, the first copy is delayed zero bit times, the second copy is delayed one bit time, and so on, such that the N+1th copy is delayed N bit times. In this way, all address bits and the starting flag location are aligned in time, respectively, across the N+1 copies after N bit times delay. The first N successive copies are fed individually into N successive optical samplers. Because of the successive delays in the first N successive copies, the N successive address bits arrive at the N success optical samplers after N bit times delay. The N optical samplers are clocked to simultaneously sample the N address bits at an appropriate time triggered off of the starting flag. The sampled address bits are fed into an optical N-to-M address decoder, which activates one of the M optical outputs based upon the N optical inputs. The N+1th copy is fed to all outputs, but is only output over the activated output. The starting flag is added back into the outgoing packet at the appropriate time so that a correctly formatted packet is output.

FIG. 2 is a schematic block diagram showing the relevant logic blocks of an optical switching device 200. Among other things, the optical switching device 200 includes framing logic 202, copying/delaying logic 203, address sampling logic 204, address decoding logic 205, and output logic 206.

The framing logic 202 receives the optical input signal 201 and monitors the optical input signal 201 for the starting flag of a packet. When the framing logic 202 detects the starting flag of a packet, the framing logic 202 removes the starting flag from the packet. The framing logic 202 passes the resulting packet to the copying/delaying logic 203 as signal 270. The framing logic 202 sends a starting flag signal 260 to the output logic 206, and also sends a delayed clocking signal 250 derived from the starting flag to the address sampling logic 204.

Figure 3:
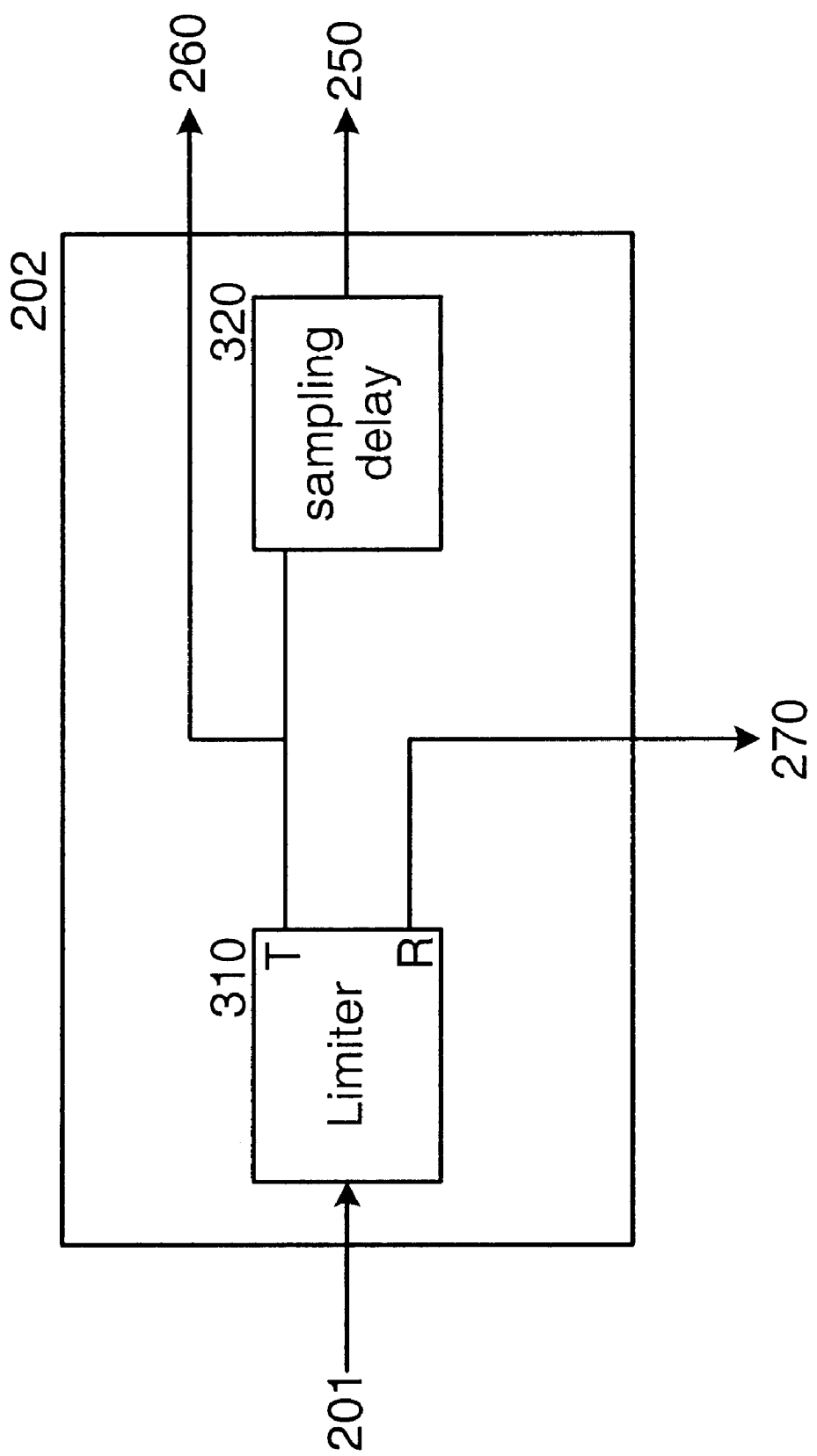
FIG. 3 is a schematic block diagram showing the relevant components of framing logic in accordance with an embodiment of the present invention.

FIG. 3 is a schematic block diagram showing the relevant components of the framing logic 202. Among other things, the framing logic 202 includes an optical hard limiter 310 and a sampling delay element 320. The optical hard limiter 310 receives the optical input signal 201. The optical hard limiter 310 feeds the transmitted signal to the output logic 206 as signal 260 and to the sampling delay element 320, and feeds the reflected signal to the copying/delaying logic 203 as signal 270. The sampling delay element 320 generates the delayed clocking signal 250 a predetermined amount of time after the starting flag. The delayed clocking signal 250 controls the address sampling function of the address sampling logic, as described in more detail below.

The copying/delaying logic 203 receives the signal 270 from the framing logic 202 and produces N+1 successive copies $210_1$–$210_{N+1}$ with approximately one bit time delay between successive copies. The copying/delaying logic 203 feeds the first N copies $210_1$–$210_N$ to the address sampling logic 204, and feeds the last copy $210_{N+1}$ to the output logic 206.

Figure 4:
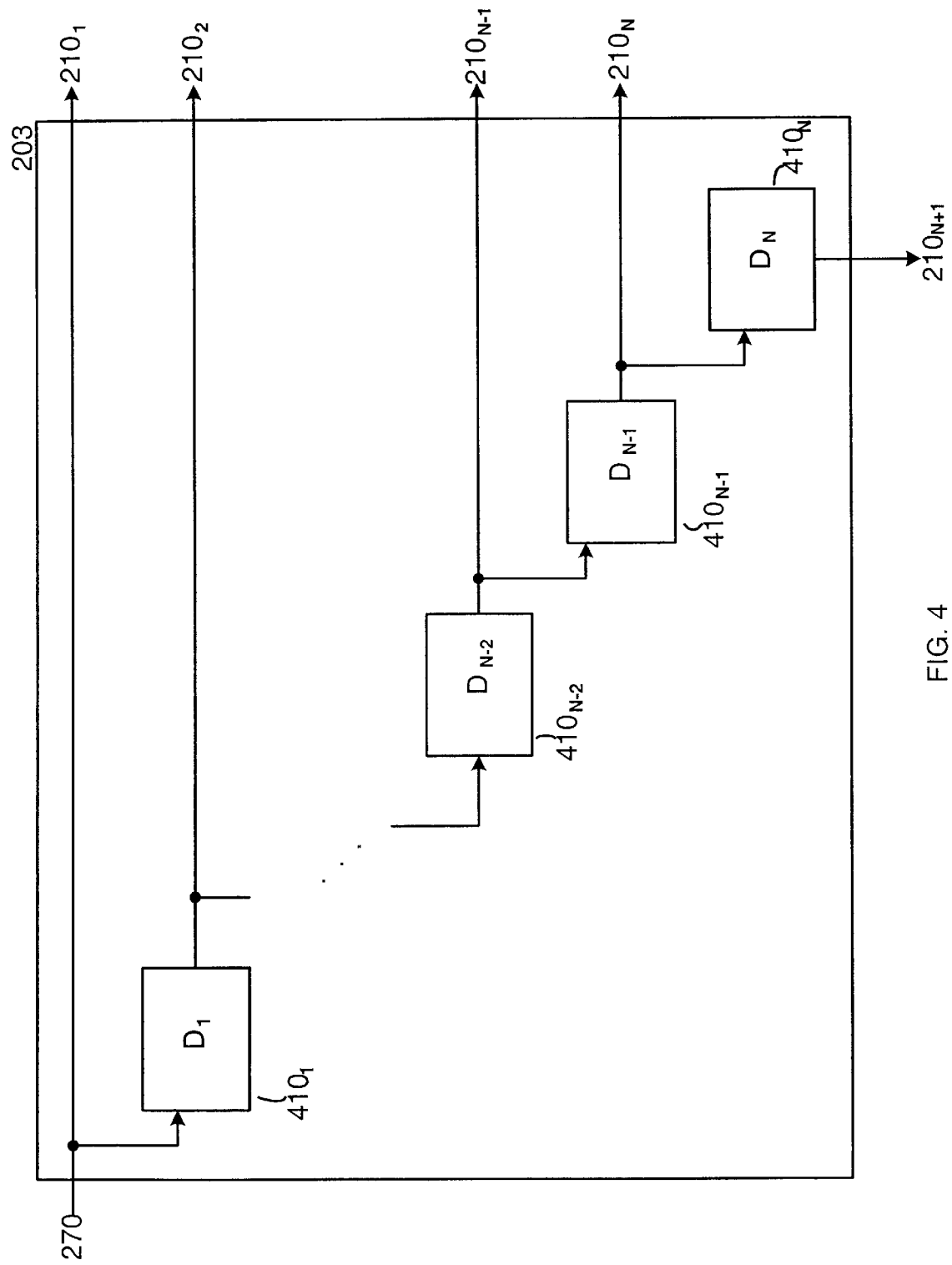
FIG. 4 is a schematic block diagram showing the relevant components of copying/delaying logic in accordance with an embodiment of the present invention.

FIG. 4 is a schematic block diagram showing the relevant components of the copying/delaying logic 203. Among other things, the copying/delaying logic 203 includes N delay elements $410_1$–$410_N$. Each delay element 410 introduces one bit time delay to its input bit stream. The copying/delaying logic 203 splits the signal 270 into N+1 successive copies, with one bit time delay added to each successive copy. Specifically, the signal 270 is split into two copies, a copy $210_1$ with no delay and a duplicate copy that is fed into the delay element $410_1$. The output of the delay element $410_1$ is split into two copies, a copy $210_2$ with one bit time delay and a duplicate copy that is fed into the next successive delay element (not shown). Subsequent copies are split in a similar fashion, until the Nth copy $210_N$ with N−1 bit times delay is produced and a duplicate copy is fed into the delay element $410_N$ to produce the N+1th copy $210_{N+1}$ with N bit times delay.

Figure 5:
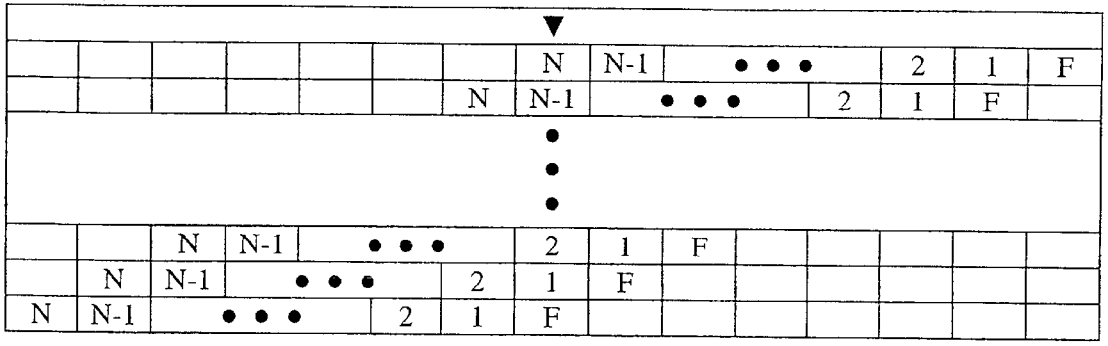
FIG. 5 is a block diagram showing the relative timing of successive packet copies produced by the copying/delaying logic in accordance with an embodiment of the present invention.

FIG. 5 shows the relationship between the N+1 successive copies $210_1$–$210_{N+1}$ produced by the copying/delaying logic 203. As shown in FIG. 5, the N address bits and the starting flag location are aligned in time after N bit times delay, as shown by the arrow 510.

The address sampling logic 204 receives the first N successive copies $210_1$–$210_N$ from the copying/delaying logic 203 as well as the delayed clocking signal 250 and samples the N address bits when triggered by the delayed clocking signal 250. The address sampling logic 204 outputs the N sampled address bits $220_1$–$220_N$ to the address decoding logic 205.

Figure 6:
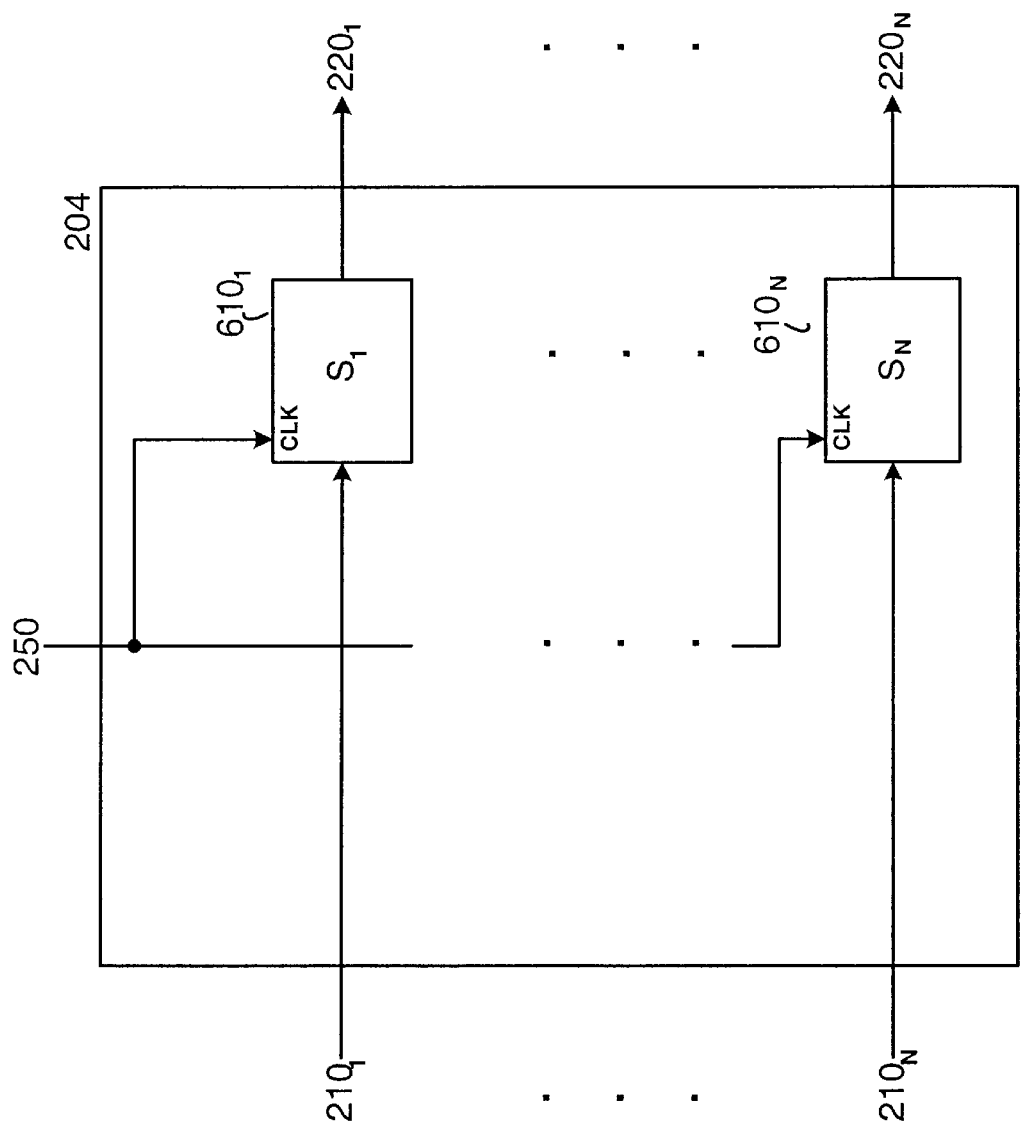
FIG. 6 is a schematic block diagram showing the relevant components of address sampling logic in accordance with an embodiment of the present invention.

FIG. 6 is a schematic block diagram showing the relevant components of the address sampling logic 204. Among other things, the address sampling logic 204 includes N optical samplers $610_1$–$610_N$. The copies $210_1$–$210_N$ are fed individually the inputs of the N optical samplers $610_1$–$610_N$, respectively. The delayed clocking signal 250 is fed to the clock input of the N optical samplers $610_1$–$610_N$. The N optical samplers $610_1$–$610_N$ sample the N address bits when triggered by the delayed clocking signal 250 from the framing logic 202. The optical sampler $610_1$ samples address bit N, the optical sampler $610_2$ samples address bit N−1, and so on. The N sampled address bits $220_1$–$220_N$ are fed to the address decoding logic 205.

The address decoding logic 205 receives the N sampled address bits $220_1$–$220_N$ from the address sampling logic 204 and activates one of M output signals $230_1$–$230_M$ based upon the N sampled address bits $220_1$–$220_N$. An optical N-to-M decoder can be built from the various optical logic devices described in the related applications incorporated by reference above, and the details of a generic N-to-M decoder are omitted for convenience. However, an exemplary optical 2-to-4 decoder is shown and described below.

The output logic 206 is coupled to the M output signals $230_1$–$230_M$, and also receives the starting flag signal 260 and the last copy $210_{N+1}$. The output logic 206 inserts the starting flag into the last copy $210_{N+1}$ and outputs the resulting packet over the one of M outputs $240_1$–$240_M$ activated by the address decoding logic 205 using the M output signals $230_1$–$230_M$.

Figure 7:
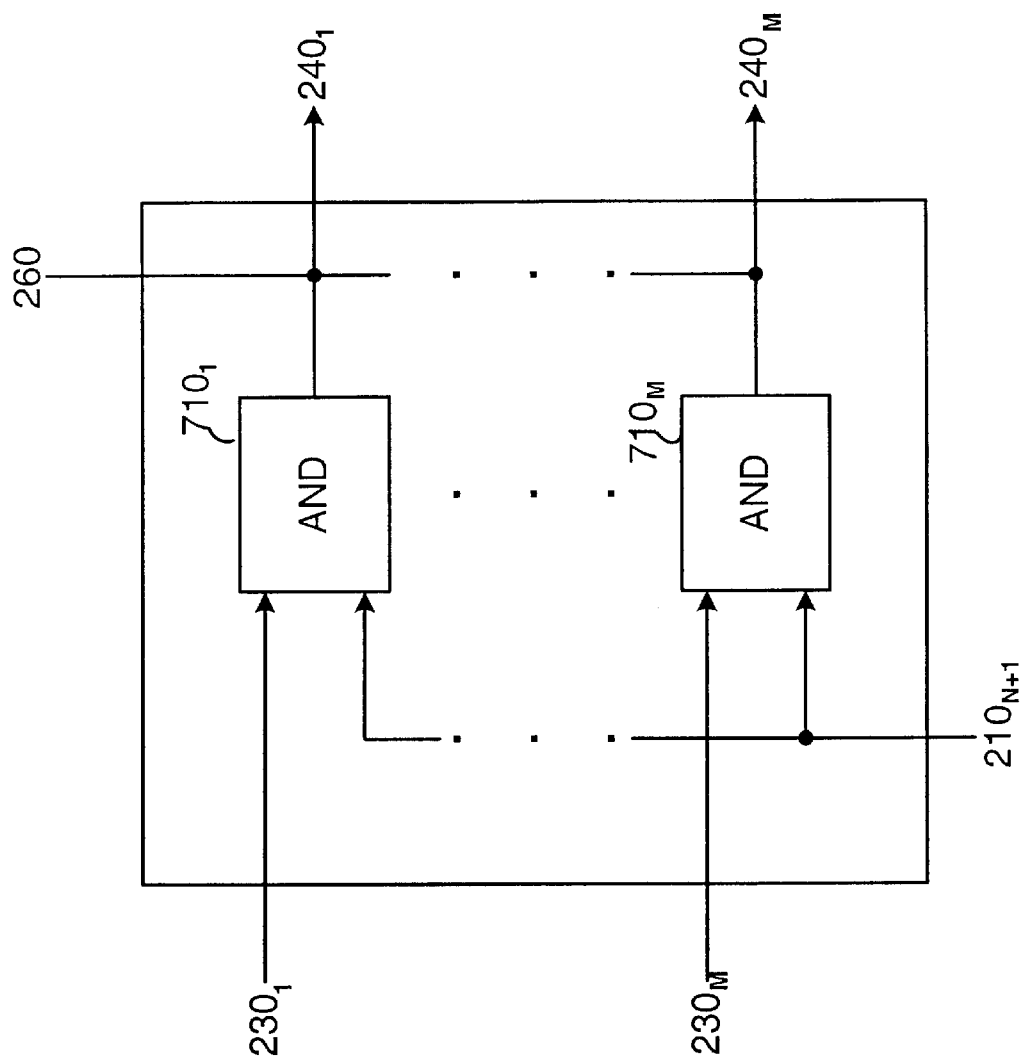
FIG. 7 is a schematic block diagram showing the relevant components of output logic in accordance with an embodiment of the present invention.

FIG. 7 is a schematic block diagram showing the relevant components of the output logic 206. Among other things, the output logic 206 includes M optical AND gates $710_1$–$710_M$. Each of the M output signals $230_1$–$230_M$ are coupled to one input of a respective optical AND gate $710_1$–$710_M$. The last copy $210_{N+1}$ is coupled to the other input of all optical AND gates $710_1$–$710_M$. The starting flag signal 260 is coupled to all M outputs $240_1$–$240_M$ on the output side of the M optical AND gates $710_1$–$710_M$.

It should be noted that each time an optical signal is split, the signal intensity is reduced on each branch by approximately one half. Therefore, optical gain elements are used at appropriate points in the optical switching device 200 to amplify optical signals. The gain elements are omitted from the figures for convenience.

Various aspects of the present invention can be demonstrated by example with reference to an optical switching device that switches packets from an input to four outputs based upon two address bits in each packet (i.e., N=2 and M=4).

Figure 8:
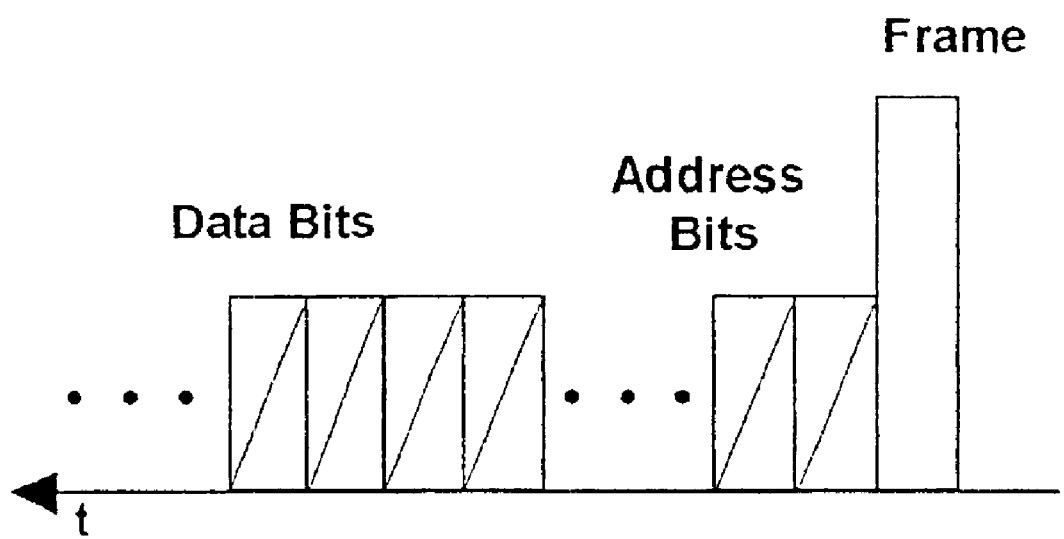
FIG. 8 shows the format of an exemplary packet in accordance with an embodiment of the present invention.

FIG. 8 shows an exemplary packet 800 that includes a starting (framing) bit, two address bits, and a number of data bits.

Figure 9:
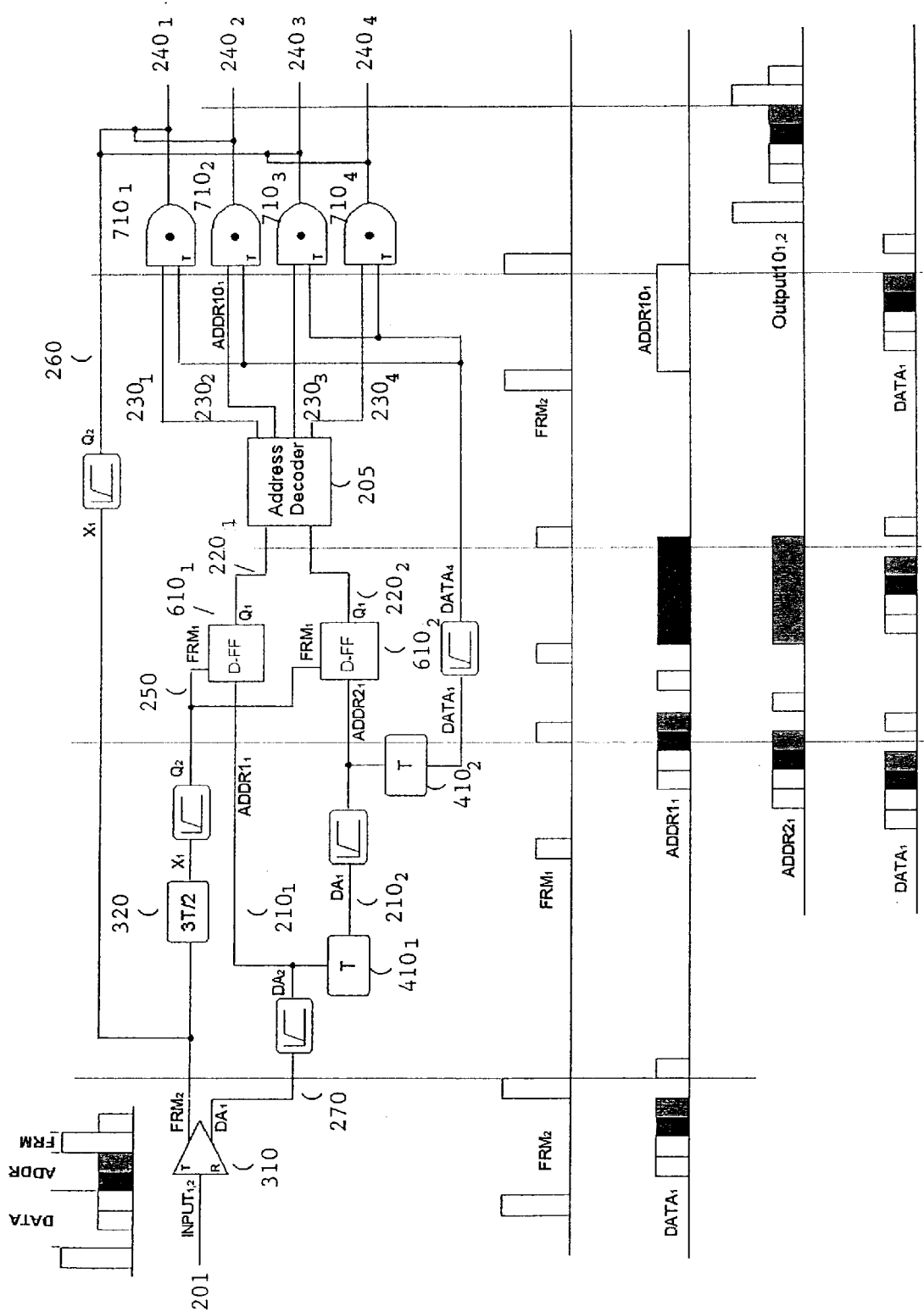
FIG. 9 is a schematic block diagram showing an exemplary optical switching device for switching optical information from an input to one of four outputs based upon two address bits in each packet in accordance with an embodiment of the present invention.
Figure 10:
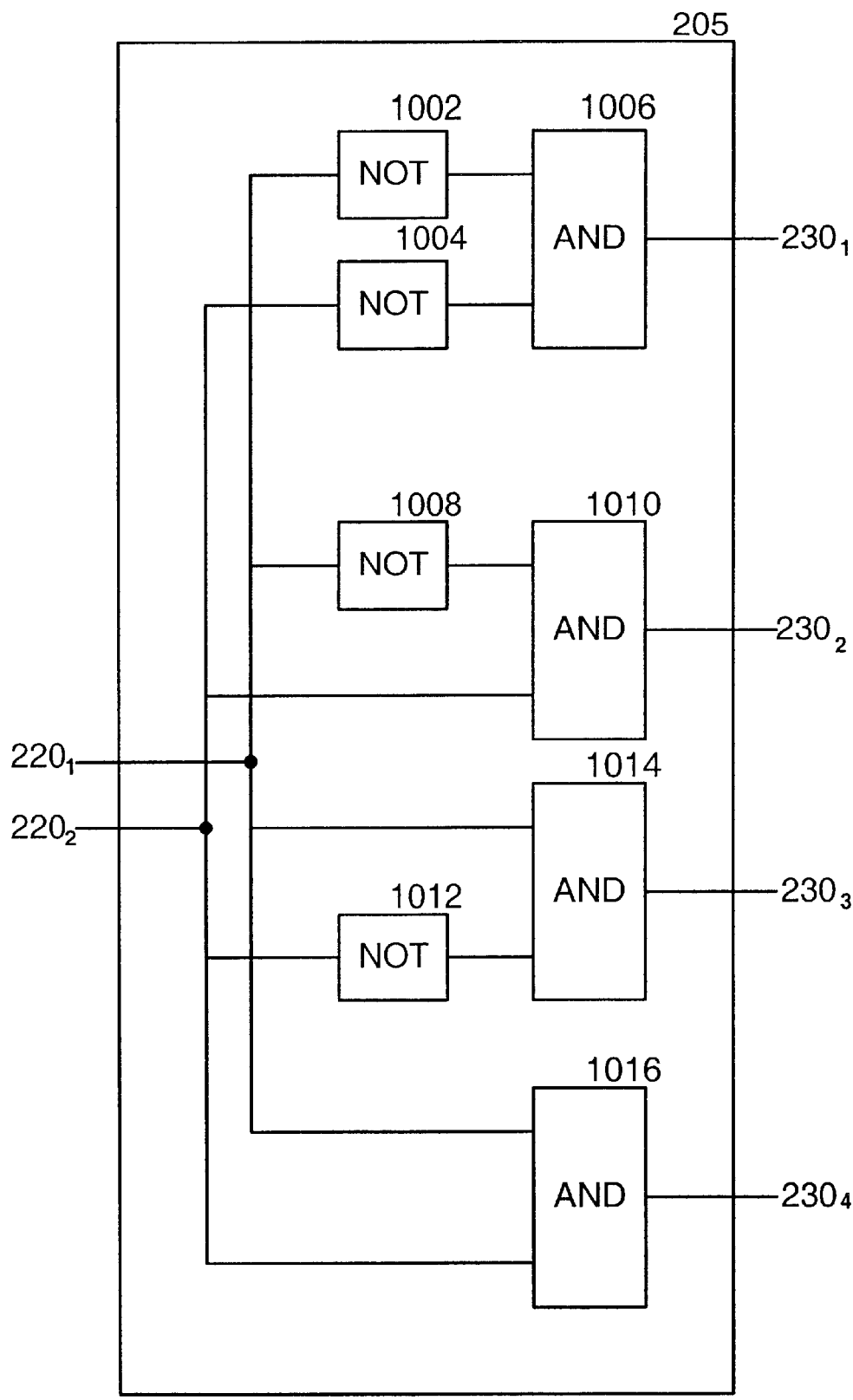
FIG. 10 is a schematic block diagram showing the relevant components of an exemplary 2-to-4 address decoder in accordance with an embodiment of the present invention.

FIG. 9 is a schematic block diagram showing an exemplary optical switching device 900 for switching packets from an input to one of four outputs based upon two address bits in each packet. For convenience, reference numbers for elements shown in FIG. 10 are consistent with the reference numbers used in FIGS. 2–7. Also for convenience, timelines for the three packet copies are shown.

The optical switching device 900 switches packets from an input 201 to one of four outputs $240_1$–$240_4$ based upon two address bits in each packet. The optical hard limiter 310 receives the optical input signal 201 and separates the framing bit from the packet. The transmitted signal from the optical hard limiter 310 (i.e., the framing bit) is coupled to the outputs $240_1$–$240_4$ as signal 260 and to the sampling delay element 320. The sampling delay element 320 generates the delayed clocking signal 250 after a delay of approximately 3T/2 (where T is one bit time). The reflected signal 270 from the optical hard limiter 310 is split into two copies, a copy $210_1$ with no delay that is fed into the optical sampler $610_1$ and a duplicate copy that is fed into the delay element $410_1$. The output of the delay element $410_1$ is split into two copies, a copy $210_2$ with one bit time delay that is fed into the optical sampler $610_2$ and a duplicate copy that is fed into delay element $410_2$. The output of the delay element $410_2$ produces a copy $210_3$ with two bit times delay that is fed to the optical AND gates $710_1$–$710_4$. The optical samplers $610_1$ and $610_2$ sample the copies $210_1$ and $210_2$, respectively, when clocked by the delayed clocking signal 250. The sampled address bits $220_1$ and $220_2$ are fed into the address decoder 205, which activates one of the four output signals $230_1$–$230_4$ based upon the two sampled address bits $220_1$ and $220_2$. This in turn activates one of the four optical AND gates $710_1$–$710_4$, and the copy $210_3$ is output over the activated output $240_1$–$240_4$. The framing signal 260 adds the framing bit back into the packet at the appropriate time so that the entire packet is output.

It will be apparent to a skilled artisan that the optical N-to-M address decoder 205 can be constructed using various optical logic gates and devices described in the related applications incorporated by reference above, and the present invention is not limited to any particular optical N-to-M address decoder. FIG. 10 is a schematic block diagram showing an exemplary optical 2-to-4 address decoder 205 for use in the optical switching device shown in FIG. 9. Among other things, the optical 2-to-4 address decoder 205 includes optical NOT gates 1002, 1004, 1008, 1012 and optical AND gates 1006, 1010, 1014, 1016. The sampled address bit $220_1$ is coupled to optical AND gates 1006 and 1010 through optical NOT gates 1002 and 1008, respectively, and to optical AND gates 1014 and 1016. The sampled address bit $220_2$ is coupled to optical AND gates 1006 and 1014 through optical NOT gates 1008 and 1012, respectively, and to optical AND gates 1010 and 1016. If sampled address bits $220_1$ and $220_2$ are zero and zero, respectively, then the output signal $230_3$ is activated. If sampled address bits $220_1$ and $220_2$ are zero and one, respectively, then the output signal $230_2$ is activated. If sampled address bits $220_1$ and $220_2$ are one and zero, respectively, then the output signal $230_3$ is activated. If sampled address bits $220_1$ and $220_2$ are one and one, respectively, then the output signal $230_4$ is activated.

Figure 11:
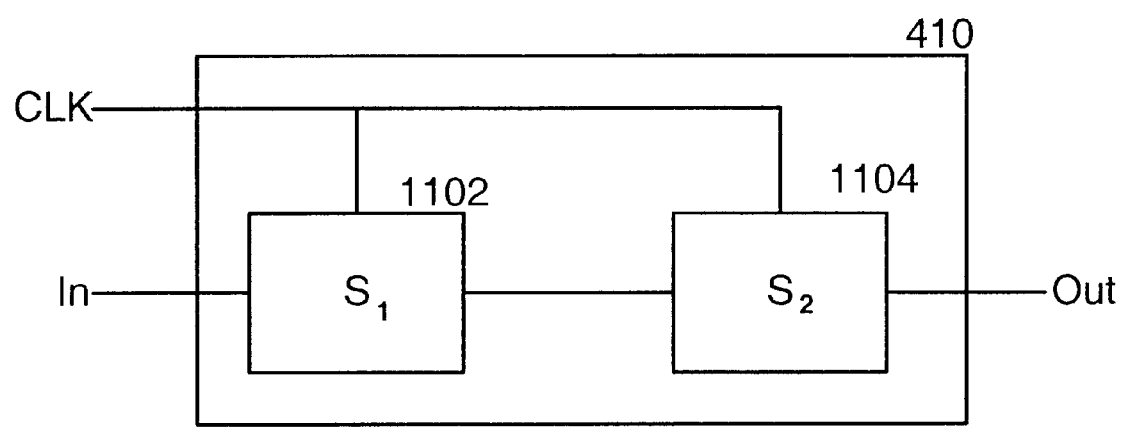
FIG. 11 is a schematic block diagram showing the relevant components of an exemplary optical delay element in accordance with an embodiment of the present invention.

It will also be apparent to a skilled artisan that the various optical delay elements can be constructed using various optical logic gates and devices described in the related applications incorporated by reference above, and the present invention is not limited to any particular optical delay elements. FIG. 11 is a schematic block diagram showing an optical delay element 410 for introducing one bit time delay. Among other things, the optical delay element 410 includes two optical samplers 1102 and 1104 coupled in series. The optical samplers 1102 and 1104 are clocked at the optical bit rate. The output of the optical delay element 410 is delayed one bit time from the input.

In the exemplary embodiment described above, the address bits are sampled by splitting the packet into N+1 successive copies with approximately one bit time delay between successive copies. However, the present invention is in no way limited to this technique for sampling the address bits or to any particular way of sampling the address bits.

For one example, the address bits can be sampled using an optical shift register of sorts. The optical shift register includes N optical samplers coupled in series. The packet is shifted through the optical shift register until all N address bits are sampled, at which time the address decoding logic is clocked to decode the sampled address bits.

Figure 12:
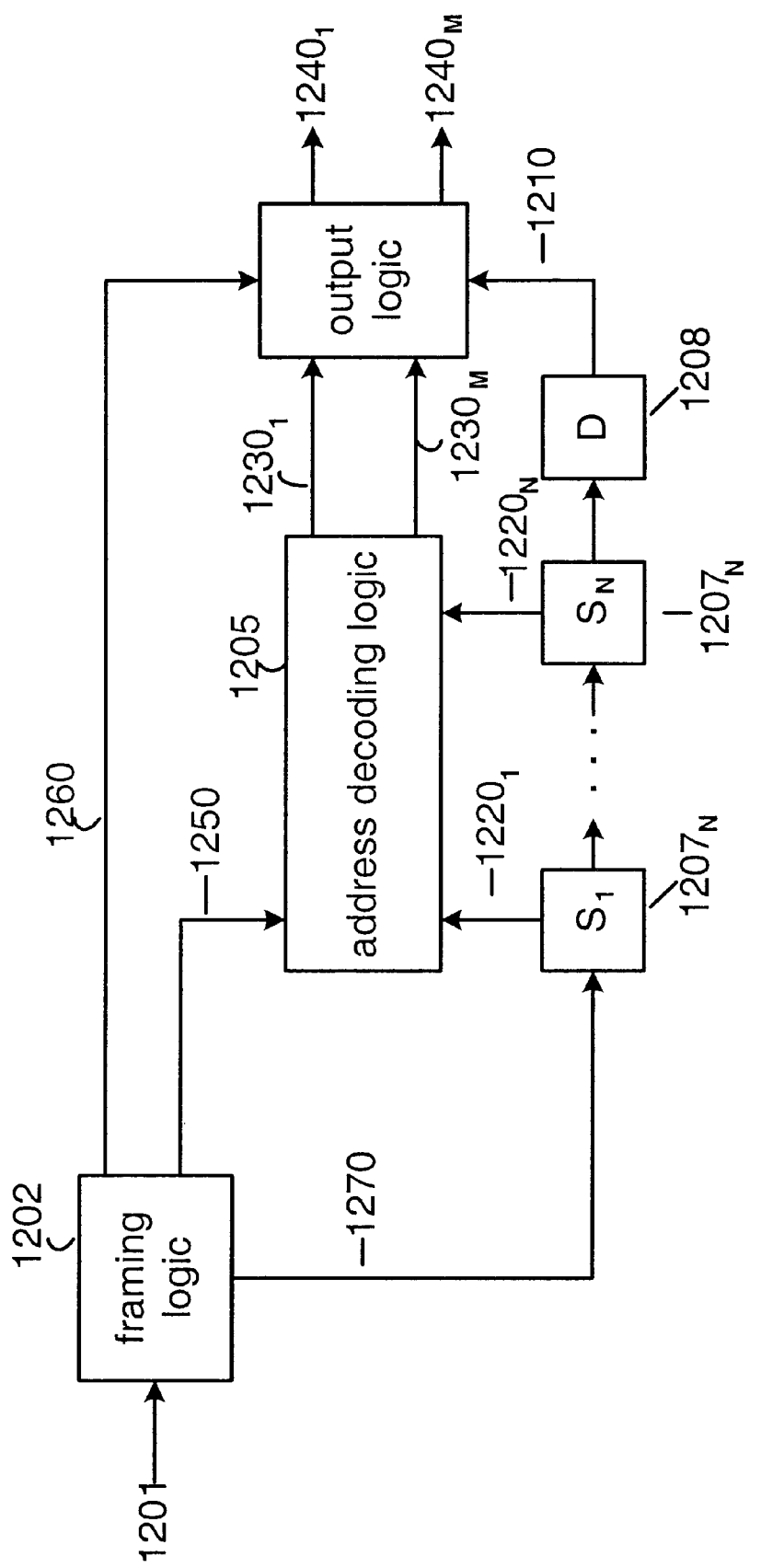
FIG. 12 is a schematic block diagram showing an exemplary optical switching device that uses an optical shift register to sample address bits in accordance with an embodiment of the present invention.

FIG. 12 is a schematic block diagram showing an exemplary optical switching device 1200 that uses an optical shift register of sorts for sampling the N address bits. The optical shift register includes N optical samplers $1207_1$–$1207_N$ and an optical delay element 1208 coupled in series. The N optical samplers $1207_1$–$1207_N$ and the optical delay element 1208 are clocked at the optical bit rate.

The framing logic 1202 receives the optical input signal 1201 and monitors the optical input signal 1201 for the starting flag of a packet. When the framing logic 1202 detects the starting flag of a packet, the framing logic 1202 removes the starting flag from the packet. The framing logic 1202 passes the resulting packet to the optical shift register 1207 as signal 1270. The framing logic 1202 sends a starting flag signal 1260 to the output logic 1206, and also sends a delayed clocking signal 1250 derived from the starting flag to the address decoding logic 1205.

The signal 1270 is propagated through the optical shift register 1207 and the optical delay element 1210. When all N address bits have been sampled by the N optical samplers $1207_1$–$1207_N$, the delayed clocking signal 1250 prompts the address decoding logic 1205 to decode the sampled address bits $1220_1$–$1220_N$ and activate one of the output signals $1230_1$–$1230_M$ to the output logic 1206. The delayed packet copy 1210 is also fed into the output logic 1206, with the optical delay element 1208 adding an appropriate amount of delay such that the delayed packet copy 1210 arrives at the output logic 1206 at the appropriate time. The output logic 1206 outputs the delayed packet copy 1210 over one of the outputs $1240_1$–$1240_M$ activated by the output signals $1230_1$–$1230_M$.

It should be noted that certain details of the embodiment shown and described with reference to FIG. 12 have been omitted for convenience.

It should be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

Additional considerations are discussed in E. V. Johnson, L. Brzozowski, E. H. Sargent, ALL-OPTICAL TIME-DOMAIN IP ROUTER USING OPTICAL LIMITERS, IEEE Lasers and Electro-Optics Society 2000 Annual Meeting (LEOS 2000), Puerto Rico, Nov. 13–16, 2000, and in E. V. Johnson, ALL-OPTICAL SIGNAL PROCESSING AND PACKET FORWARDING USING NONMONOTONIC INTENSITY TRANSFER CHARACTERISTICS, a thesis submitted in conformity with the requirements for the degree of Master of Applied Science, Graduate Department of Electrical and Computer Engineering, University of Toronto, 2001, both of which are hereby incorporated herein by reference in their entireties.

The present invention may be embodied in other specific forms without departing from the true scope of the invention. The described embodiments are to be considered in all respects only as illustrative and not restrictive.

What is claimed is:

1. An optical switching device based upon stable, non-absorbing optical hard limiters, the optical switching device comprising:

means for sampling a number of address bits in an optical information stream; and means for selecting an output for the optical information stream based upon the sampled address bits;

means for outputting the optical information stream over the selected output; and means for providing an optical framing signal to the address bit sampling means.

2. The optical switching device of claim 1, where said means for sampling a number of address bits in an optical information stream comprises:

means for splitting the optical information steam into a number of successive copies with approximately one bit time delay between successive copies; and means for sampling a different address bit from each of the successive copies based upon an delayed clocking signal.

3. The optical switching device of claim 1, wherein said means for sampling a number of address bits in an optical information stream comprises:

means for sampling the address bits serially.

4. The optical switching device of claim 1, wherein said means for selecting an output for the optical information steam based upon the sampled address bits comprises:

means for decoding the sampled address bits; and means far activating the output based upon the decoded address bit.

* * * * *

UNITED STATES PATENT AND TRADEMARK OFFICE
CERTIFICATE OF CORRECTION

PATENT NO. : 6,636,337 B2
DATED : October 21, 2003
INVENTOR(S) : Johnson

It is certified that error appears in the above-identified patent and that said Letters Patent is hereby corrected as shown below:

<u>Column 8,</u>
Line 19, delete "upon" and insert therefore -- on --.
Line 24, insert -- and -- after ";".
Line 28, delete ";and" after "output."
Lines 29-30, delete "means for providing an optical framing signal to the address bit sampling means".
Line 38, delete "an" and insert -- a --.

Signed and Sealed this

Twenty-first Day of June, 2005

JON W. DUDAS
*Director of the United States Patent and Trademark Office*